E. A. NELSON.
SPRING SUSPENSION FOR MOTOR VEHICLES.
APPLICATION FILED DEC. 26, 1908.
1,005,284.
Patented Oct. 10, 1911.
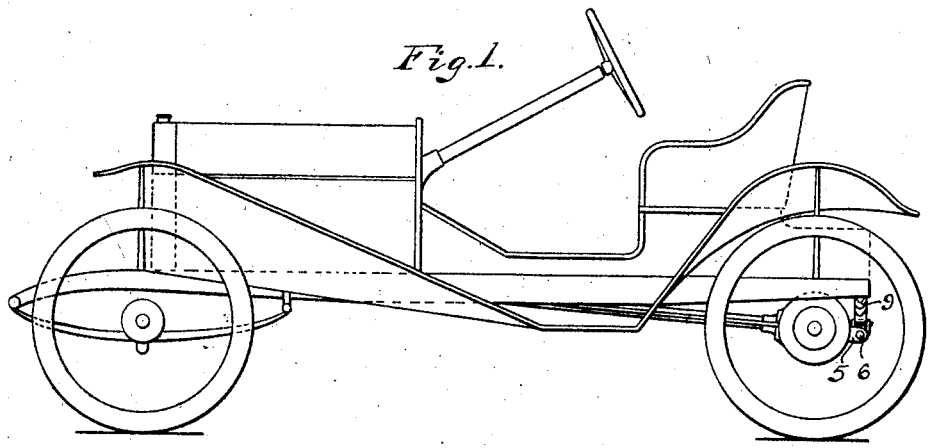
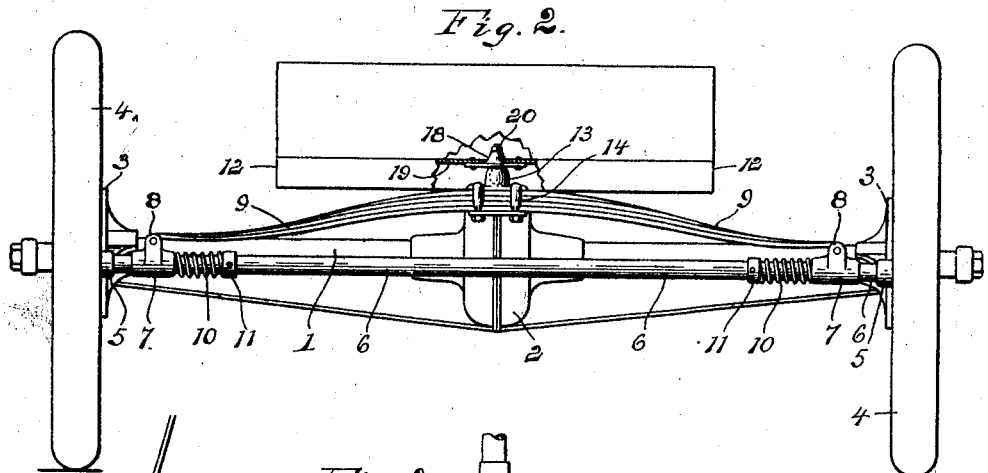
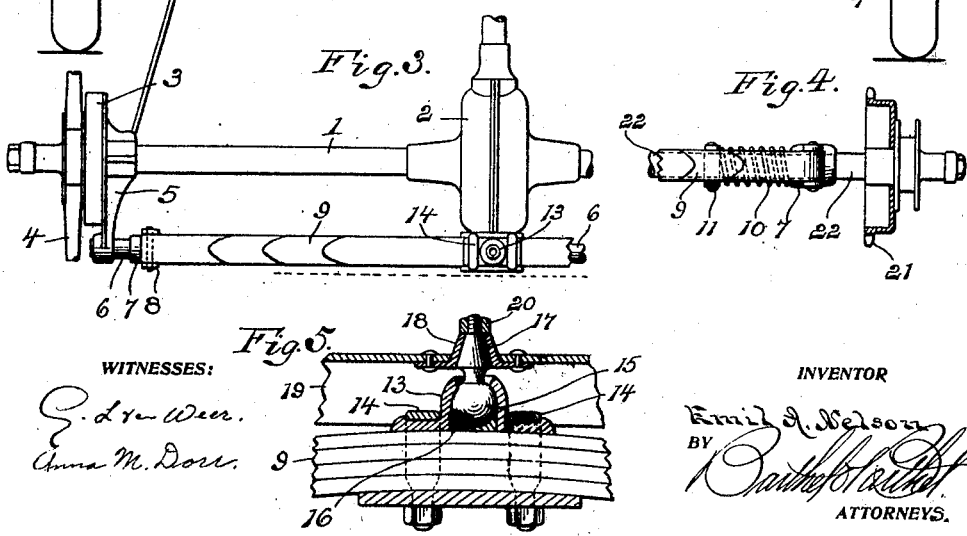
WITNESSES:
INVENTOR
Emil A. Nelson
BY
ATTORNEYS.

UNITED STATES PATENT OFFICE.

EMIL A. NELSON, OF DETROIT, MICHIGAN.

SPRING SUSPENSION FOR MOTOR-VEHICLES.

1,005,284.

Specification of Letters Patent. Patented Oct. 10, 1911.

Application filed December 26, 1908. Serial No. 469,316.

*To all whom it may concern:*

Be it known that I, EMIL A. NELSON, a citizen of the United States of America, residing at Detroit, in the county of Wayne 5 and State of Michigan, have invented certain new and useful Improvements in Spring Suspension for Motor-Vehicles, of which the following is a specification, reference being had therein to the accompanying drawings.

10 This invention relates to improvements in vehicle springs and more particularly to springs adapted to support motor vehicle body frames and the like where the spring is subjected to heavy strains and shocks, and 15 extreme deflection, which causes sudden rebounds.

The object of the invention is to provide a simple and cheap spring having great flexibility and yet having the necessary re20 sistance to carry heavy loads without injury to the spring and also so constructed as to retard the rebound, operating as a shock absorber to prevent the transmission of sudden jolts, jars, etc., to the body of the ve25 hicle.

A further object is to provide a spring which will permit the raising of one end of the vehicle axle to which it is attached without putting a torsional strain upon the body 30 frame supported thereby, and to provide certain other new and useful features all as hereinafter more fully described, reference being had to the accompanying drawing, in which:—

35 Figure 1 is a side elevation of an automobile in which the spring embodying this invention is employed to support the rear end of the body frame. Fig. 2 is an enlarged rear elevation of the same. Fig. 3 is a de40 tail view showing in plan view a portion of the rear axle, the spring and its support. Fig. 4 is a detail illustrating a modified construction. Fig. 5 is an enlarged sectional detail of the connection of the spring to the 45 body frame.

In the drawings I have shown the spring embodying this invention as applied to the rear axle of an automobile, but I do not wish to limit myself to such application as the 50 spring may be used upon the front as well as the rear axle.

In the drawings 1 is the outer tubular sleeve of the ordinary automobile rear axle provided with a gear casing 2 intermediate 55 its ends, and brake drums 3 at each end.

4 are the ordinary rear driving wheels of the automobile secured upon the ends of the live shaft of the axle in the usual manner in such constructions. Adjacent to and formed integral with each brake support is 60 a rigid arm 5 extending rearwardly from the fixed sleeve of the axle, and in bearings in the rear ends of these arms is mounted a transverse shaft 6 extending parallel with the axle. Upon this shaft 6 are the sleeves 65 7 free to slide longitudinally thereon, one near each supporting arm for the shaft and upon each sleeve are upwardly extending ears 8 between which is pivotally attached the ends of a semi-elliptic leaf spring 9 which 70 lies above and extends longitudinally of said supporting shaft 6. Two coiled springs 10 are sleeved upon the shaft 6, one in engagement with the inner end of each sleeve, and collars 11 are fixed on the shaft to engage 75 the inner ends of said coiled springs and hold the same under compression in engagement with the sleeves.

12 is the body frame which as shown is preferably made of pressed steel formed 80 channel shape in cross section. A socket member 13 is secured to the upper side of the spring 9 intermediate its ends by clips 14. This socket is open at its lower side, and before it is secured to the spring a ball 85 15 is slipped into the socket through the open side and a follower block 16 placed in the lower end of the socket to form a bearing for the ball, and the ball and block are held in place by the securing of the socket 90 member to the spring. The ball is formed with a tapering shank 17 which extends upward through an opening in the top of the socket to engage a conical socket member 18 which is secured by rivets or otherwise 95 within an opening in the top of the channel bar 19 forming the rear end of the body frame 12. The shank 17 has a screwthreaded upwardly extending end projecting through the upper end of the socket 18 100 and the shank is secured in this socket by a nut 20 upon the screw-threaded end to engage the end of the socket and draw the tapering portion of the shank firmly to its seat in the socket. 105

As shown in Fig. 4, when power to drive the automobile is applied to sprockets 21 secured to the driving wheels and the rear axle comprises a fixed shaft 22 upon the end of which the wheels turn freely the 110 spring 9 may be supported directly above the axle, there being no gear casing to hinder the free movement of the spring. In this construction the sleeves 7 are placed directly upon said shaft 22 thus dispensing with the supporting shaft 6.

By mounting the spring so that its ends have a free lateral movement, said spring is free to straighten upon flexure and thus the full benefit of its resiliency is secured, and by providing the coiled springs 10 to engage under compression the inner ends of the sleeves, the outward movement of the sleeves is assisted by said springs when the main spring is flexed, thus increasing its flexibility. Upon the rebound or reflex action of said spring 9, the sleeves move inward upon their supporting shaft and said coiled springs resist this movement, acting as yielding buffers for the sleeves and thus serving as shock absorbers to prevent rebound or heavy recoil of the spring.

The ball and socket connection between the spring 9 and the body frame, allows of a free rocking movement of the spring upon its point, and when one wheel is suddenly raised by running over an obstruction, the spring will turn upon the ball relative to the body frame as one end of the axle raises, without putting a torsional strain upon the frame or subjecting the spring to extreme flexure at one end. The side shock which is ordinarily transmitted to the body frame by the sudden lifting of one wheel is also prevented by the coiled springs 10 which permit of a slight lateral movement of the spring 9 relative to the axle. All side jolts, jars, and strains are lessened by said coiled springs which act as side buffers, yielding under side thrusts.

What I claim as my invention is:—

1. In a spring support for vehicles, the combination of a semi-elliptic spring supported with its ends free to move outwardly, and springs for assisting the outward movement of the ends of said spring exerting a constant force upon said ends, in the direction of the length of said spring.

2. In a spring support for motor vehicle body frames, the combination of a semi-elliptic spring, a member forming a support for said spring, sleeves movable longitudinally of said member and to which the ends of said spring are attached, and springs engaging the inner ends of said sleeves and exerting a constant outward pressure thereon.

3. The combination with the rear driving axle of a motor vehicle embodying a fixed sleeve and a gear casing intermediate its ends, of arms secured to the fixed sleeve and extending laterally therefrom, supporting means carried by said arms, and a semi-elliptic spring supported at its ends by said supporting means and extending longitudinally of the axle at one side of the vertical plane of said axle and its gear casing.

4. The combination with the rear driving axle of a motor vehicle embodying a fixed sleeve and a gear casing intermediate its ends, of arms secured to the fixed sleeve and extending laterally therefrom, a supporting shaft carried by said arms and extending parallel with said axle, a semi-elliptic spring, and means slidable on said shaft to which the ends of said spring are pivotally attached, said spring being supported by said shaft in the vertical plane thereof and at one side of the vertical plane of the axle and its gear casing.

5. In a spring support for motor vehicle body frames, the combination of a semi-elliptic spring, a socket member having an opening in its lower side, a ball to engage said socket, a follower within the socket forming a seat for the ball, means for securing the socket to the upper side of said spring intermediate its ends, means for securing said ball to the body frame to be supported by the spring, a support for the spring, and means for attaching the ends of the spring to its support and permitting a bodily longitudinal movement of the spring upon said support.

6. The combination with a vehicle axle and a body frame, of a semi-elliptic spring supported by the axle with its ends free to move outwardly longitudinally of the axle, means acting upon the ends of said spring to supplement the effect of a load thereon, and a universal joint connection intermediate the ends of the spring between said spring and the body frame.

7. The combination with a vehicle axle and a body frame, of a semi-elliptic spring supported by the axle with its ends free to move outwardly longitudinally of the axle, means acting upon the ends of said spring to supplement the effect of a load thereon, a socket member secured to the upper side of said spring intermediate its ends, and a ball member secured to the body frame engaging said socket to connect the frame and spring.

In testimony whereof I affix my signature in presence of two witnesses.

EMIL A. NELSON.

Witnesses:
 OTTO F. BARTHEL,
 A. M. DORR.